(12) United States Patent
Chen

(10) Patent No.: US 11,106,088 B2
(45) Date of Patent: Aug. 31, 2021

(54) DISPLAY PANEL

(71) Applicant: Shenzhen China Star Optoelectronics Semiconductor Display Technology Co., Ltd., Shenzhen (CN)

(72) Inventor: Lixuan Chen, Shenzhen (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 27 days.

(21) Appl. No.: 16/625,248

(22) PCT Filed: Nov. 11, 2019

(86) PCT No.: PCT/CN2019/116970
§ 371 (c)(1),
(2) Date: Dec. 20, 2019

(87) PCT Pub. No.: WO2021/068324
PCT Pub. Date: Apr. 15, 2021

(65) Prior Publication Data
US 2021/0109406 A1  Apr. 15, 2021

(30) Foreign Application Priority Data

Oct. 12, 2019 (CN) .......................... 201910967190.7

(51) Int. Cl.
*G02F 1/13357* (2006.01)
*G02F 1/1335* (2006.01)
(Continued)

(52) U.S. Cl.
CPC ......... *G02F 1/133621* (2013.01); *C09J 11/04* (2013.01); *G02F 1/1347* (2013.01); *G02F 1/133528* (2013.01); *G02F 1/133531* (2021.01); *G02F 1/133601* (2021.01); *G02F 1/133614* (2021.01); *G02F 2202/28* (2013.01); *G02F 2202/36* (2013.01)

(58) Field of Classification Search
CPC ......... G02F 1/133621; G02F 1/133528; G02F 1/1347; G02F 1/133614; G02F 1/133531; G02F 2202/28; G02F 2202/36
USPC .......................................................... 349/71
See application file for complete search history.

(56) References Cited

U.S. PATENT DOCUMENTS

2018/0267365 A1* 9/2018 Eckert .................... B32B 27/06
2019/0018183 A1 1/2019 Ochi
(Continued)

FOREIGN PATENT DOCUMENTS

| CN | 105778799 A | 7/2016 |
| CN | 108761886 A | 11/2018 |

(Continued)

*Primary Examiner* — Nathanael R Briggs
*Assistant Examiner* — William D Peterson
(74) *Attorney, Agent, or Firm* — Luedeka Neely Group, P.C.

(57) ABSTRACT

The present disclosure provides a display panel including a first panel, a second panel, and a bonding layer; the first panel and the second panel are laminated by the bonding layer; the bonding layer includes at least one quantum dot material layer. The display panel of the present disclosure can achieve a display effect of a pixel-level backlight modulation, and can avoid interference fringes in the middle bonding area of the first panel and the second panel.

2 Claims, 2 Drawing Sheets

(51) Int. Cl.
*G02F 1/1347* (2006.01)
*C09J 11/04* (2006.01)

(56) References Cited

U.S. PATENT DOCUMENTS

2019/0258101 A1* 8/2019 Yasui .................... G02F 1/1347
2020/0326596 A1* 10/2020 Wang ................ G02F 1/133504

FOREIGN PATENT DOCUMENTS

| CN | 108761888 A | 11/2018 |
| CN | 109471300 A | 3/2019 |
| CN | 109983397 A | 7/2019 |

* cited by examiner

DISPLAY PANEL

FIELD OF INVENTION

The present disclosure relates to a technology field of displays, and particularly relates to a display panel.

BACKGROUND OF INVENTION

Liquid crystal displays (LCDs) have many advantages such as thin body, power saving, no radiation, etc., and have been widely used, such as: LCD TV, mobile phone, personal digital assistant (PDA), digital camera, computer screen, or laptop screen, etc.

Most of the liquid crystal displays on the existing market are backlight type liquid crystal display devices, which include a backlight module and a liquid crystal panel provided on the backlight module. Therein, the liquid crystal panel generally includes a color filter substrate (CF), a thin film transistor array substrate (TFT Array Substrate), and a liquid crystal layer disposed between the two substrates. In prior art, the backlight type liquid crystal display device controls the rotation of liquid crystal molecules in the liquid crystal layer by applying a driving voltage to refract the light of the backlight module, and the light then passes through the color filter substrate to generate a color image.

Technical Problems

At present, common backlight liquid crystal display products on the market generally do not have the function of local dimming. Even if some LCD TV models have the function of local dimming, due to the insufficient number of backlight partitions (in the prior art, the number of backlight partitions is 10 to 200), there are still display defects in special screens: the bright area is not bright enough, and the dark area is not dark enough, thereby resulting in poor contrast and affecting the viewing experience of the user.

In response to the above problems, a dual LCD display panel is gradually emerging. The lower LCD display panel of the dual LCD display panel and the backlight module together form a pixel local dimming structure, which is beneficial to the normal display of the upper LCD display panel. That is, two layers of LCD display panels are bonded together, and the lower LCD display panel can control the brightness switch of the corresponding pixels of the upper LCD, thereby achieving a pixel-level backlight modulation.

However, a bonding area of the above-mentioned dual LCD display panel is prone to interference fringes regardless of using a single-layer POL or a multi-layer POL.

Therefore, a display panel is urgently needed to solve the above technical problems.

SUMMARY OF INVENTION

The present disclosure purposes to provide a display panel to solve the above problems.

In order to achieve the above purposes, the display panel described in the present disclosure adopts the following technical solutions.

A display panel includes a first panel, a second panel, and a bonding layer, the first panel and the second panel are laminated by the bonding layer; therein, the bonding layer includes at least one quantum dot material layer, the quantum dot material layer includes an adhesive and quantum dots, and the adhesive is made of at least one of hydrogel, pressure-sensitive adhesive, optical adhesive, and resin.

Furthermore, the bonding layer further includes at least one adhesive layer sandwiched between the quantum dot material layer and the first panel or the second panel.

Furthermore, the bonding layer further includes a first adhesive layer sandwiched between the quantum dot material layer and the first panel and a second adhesive layer sandwiched between the quantum dot material layer and the second panel.

Furthermore, the first panel is a liquid crystal display panel, and the first panel includes a first substrate, a second substrate opposite to the first substrate, a first liquid crystal layer sandwiched between the first substrate and the second substrate, a first polarizer arranged on a side of the first substrate away from the first liquid crystal layer, and a second polarizer sandwiched between the second substrate and the bonding layer.

Furthermore, the second panel is a liquid crystal display panel, and the second panel includes a third substrate, a fourth substrate opposite to the third substrate, a second liquid crystal layer sandwiched between the third substrate and the fourth substrate, a third polarizer sandwiched between the third substrate and the bonding layer, and a fourth polarizer arranged on a side of the fourth substrate away from the second liquid crystal layer; and therein the third substrate is a transparent substrate.

Furthermore, an absorption axis of the first polarizer and an absorption axis of the second polarizer are perpendicular to each other; an absorption axis of the third polarizer and an absorption axis of the fourth polarizer are perpendicular to each other; and the absorption axis of the second polarizer and the absorption axis of the third polarizer are parallel to each other.

A display panel includes a first panel, a second panel, and a bonding layer, therein the first panel and the second panel are laminated by the bonding layer, and the bonding layer includes at least one quantum dot material layer.

Furthermore, the quantum dot material layer includes an adhesive and quantum dots.

Furthermore, the adhesive is made of at least one of hydrogel, pressure-sensitive adhesive, optical adhesive, and resin.

Furthermore, the bonding layer includes, at least one quantum dot material layer, and at least one adhesive layer sandwiched between the quantum dot material layer and the first panel or the second panel.

Furthermore, the bonding layer includes at least one quantum dot material layer, a first adhesive layer sandwiched between the quantum dot material layer and the first panel, and a second adhesive layer sandwiched between the quantum dot material layer and the second panel.

Furthermore, the first panel is a liquid crystal display panel, and the first panel includes a first substrate, a second substrate opposite to the first substrate, a first liquid crystal layer sandwiched between the first substrate and the second substrate, a first polarizer arranged on a side of the first substrate away from the first liquid crystal layer, and a second polarizer sandwiched between the second substrate and the bonding layer.

Furthermore, the second panel is a liquid crystal display panel, and the second panel includes a third substrate, a fourth substrate opposite to the third substrate, a second liquid crystal layer sandwiched between the third substrate and the fourth substrate, a third polarizer sandwiched between the third substrate and the bonding layer, and a fourth polarizer arranged on a side of the fourth substrate away from the second liquid crystal layer; and therein the third substrate is a transparent substrate.

Furthermore, an absorption axis of the first polarizer and an absorption axis of the second polarizer are perpendicular to each other; an absorption axis of the third polarizer and an absorption axis of the fourth polarizer are perpendicular to each other; and the absorption axis of the second polarizer and the absorption axis of the third polarizer are parallel to each other.

A display device includes a display panel and a backlight module; therein, the display panel includes a first panel, a second panel, and a bonding layer, the first panel and the second panel are laminated by the bonding layer; and the bonding layer includes at least one quantum dot material layer.

Furthermore, a light source of the backlight module is a blue light source.

Beneficial Effects

Beneficial effects of the display panel described in the present disclosure are:

(1) By laminating the first panel and the second panel, the display panel of the present disclosure can achieve a pixel-level backlight modulation, thereby significantly improving the display effect.

(2) By filling quantum dots in the bonding layer, the display panel of the present disclosure can avoid the problem of interference fringes existing in the bonding area of the first panel and the second panel.

(3) An adhesion protection function of the first panel and the second panel to the bonding layer can encapsulate and protect the quantum dots, thereby reducing the water and oxygen barrier films on a top or bottom surface of the quantum dot layer or the quantum dot adhesive layer.

DETAILED DESCRIPTION OF EMBODIMENTS

Figure 1:
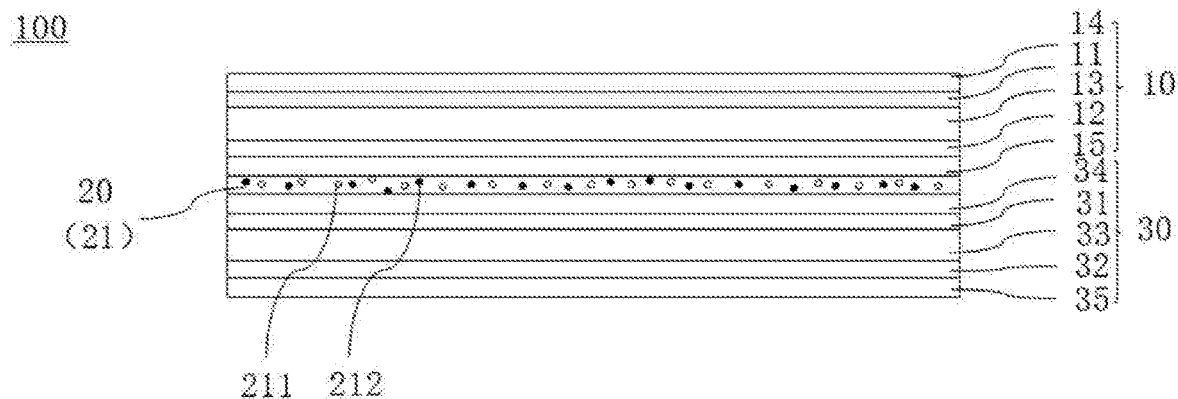
FIG. 1 is a schematic view of a display panel of an embodiment according to the present disclosure.

The technical solutions in the embodiments of the present disclosure will be clearly and completely described with reference to the accompanying drawings. Obviously, the described embodiments are only a part of the embodiments of the present disclosure, but not all. Based on the embodiments of the present disclosure, all other embodiments obtained by those skilled in the art without any creative work fall into the scope of protection of the present disclosure.

The terms "first", "second", "third", etc. (if any) in the description, claims, and the above-mentioned drawings of the present disclosure are used to distinguish similar objects, and are not necessarily used for describing a specific order or sequence. It should be understood that the objects so described are interchangeable under appropriate circumstances. In addition, terms "comprise" and "comprising" and any variations of them are intended to cover non-exclusive inclusion.

In this present disclosure, the drawings discussed below and the embodiments used to describe the principles disclosed in this application are for illustration purposes only and should not be construed as limiting the scope of this application's disclosure. Those skilled in the art should understood that the principles of the present disclosure can be implemented in any suitably arranged system. Exemplary embodiments will be described in detail, and examples of these embodiments are shown in the accompanying drawings. In addition, the exemplary embodiments will be described in detail with reference to the drawings. The same reference numerals in the figures refer to the same elements.

The terms used in the specification of this application are only used to describe specific embodiments, and are not intended to show the concepts of this application. Unless the context has a clearly different meaning, expressions used in the singular encompass expressions in the plural. In this specification, it should be understood that terms such as "comprise", "comprising" and "including" are intended to indicate the possibility of the features, numbers, steps, actions, or combinations thereof disclosed in this specification, it is not intended to exclude the possibility that one or more other features, numbers, steps, actions or combinations thereof may exist or may be added. The same reference numerals in the drawings refer to the same parts.

Figure 2:
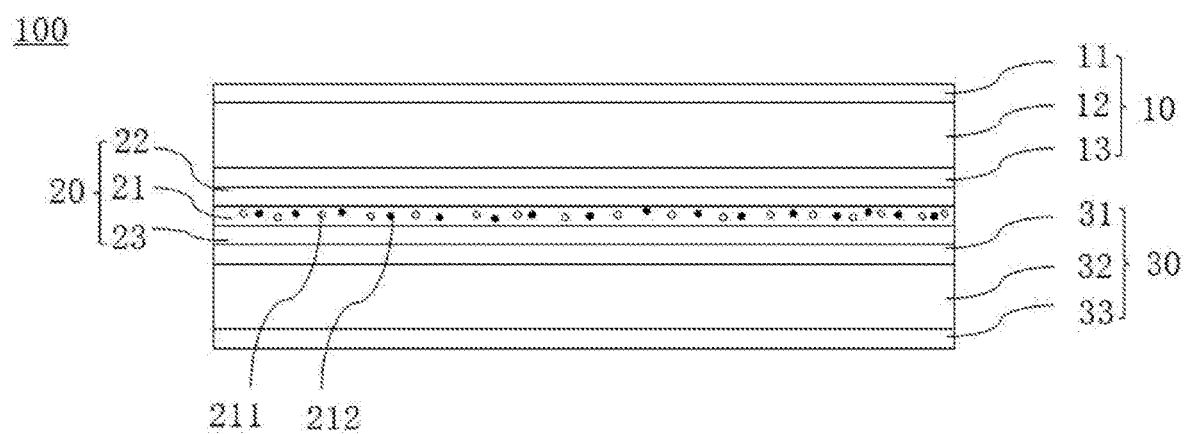
FIG. 2 is a schematic view of a display panel of another embodiment according to the present disclosure.
Figure 3A:
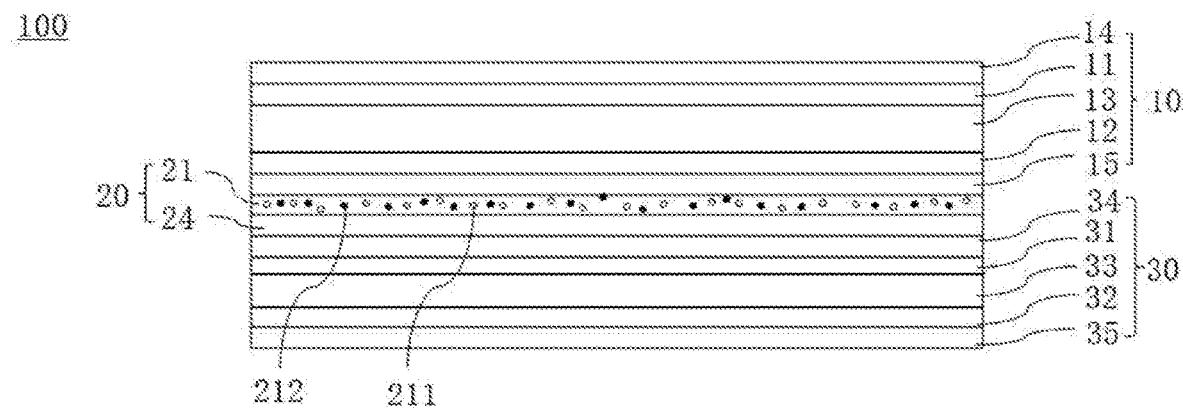
FIG. 3A is a first structural and schematic view of a display panel of another embodiment according to the present disclosure.
Figure 3B:
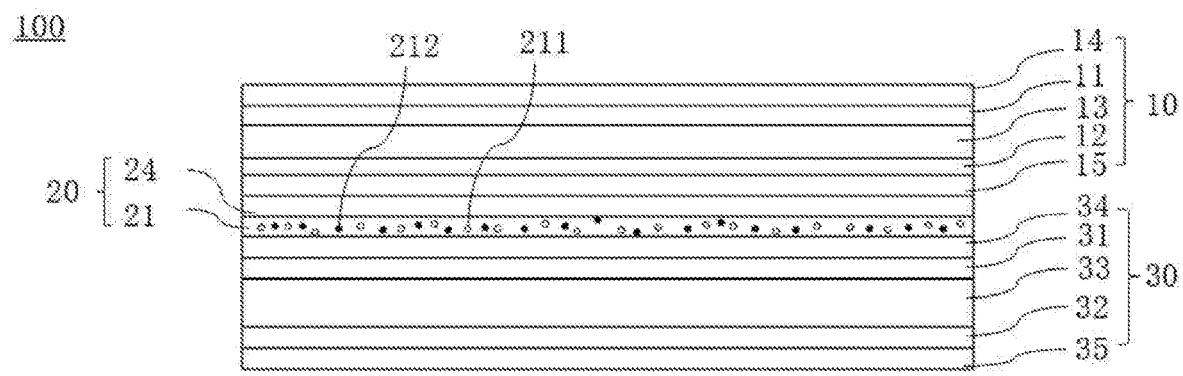
FIG. 3B is a second structural and schematic view of a display panel of another embodiment according to the present disclosure.

FIG. 1 is a schematic view of a display panel of an embodiment according to the present disclosure. FIG. 2 is a schematic view of a display panel of another embodiment according to the present disclosure. FIG. 3A is a first structural and schematic view of a display panel of another embodiment according to the present disclosure. FIG. 3B is a second structural and schematic view of a display panel of another embodiment according to the present disclosure.

As shown in FIG. 1, FIG. 2, FIG. 3A, and FIG. 3B, the present disclosure provides a display panel 100. The display panel 100 includes a first panel 10, a second panel 30, and a bonding layer 20 sandwiched between the first panel 10 and the second panel 30. The first panel 10 and the second panel 30 are laminated by the bonding layer 20. The bonding layer 20 at least includes a quantum dot material layer 21.

Since quantum dots 212 in the quantum dot material layer 21 can be excited to emit light, thereby preventing light from being refracted when passing directly through the bonding area of the first panel 10 and the second panel 30, and thereby further preventing an interference caused by the reflection of light on the upper and lower interfaces of the bonding area.

The display panel 100 of the present disclosure can achieve a pixel-level backlight modulation and improve the display effect through the dual display panel superimposed structure. Meanwhile, the display panel of the present disclosure can prevent the interference from being generated in the bonding area of the first panel 10 and the second panel 30 by filling quantum dots in at least one layer of the bonding layer 20.

As shown in FIG. 1, it is a schematic view of a display panel of an embodiment according to the present disclosure. In this embodiment, the display panel 100 includes a first panel 10, a bonding layer 20, and a second panel 30. Therein, the bonding layer 20 is a quantum dot material layer 21. The quantum dot material layer 21 includes an adhesive 211 and quantum dots 212 being dispersive in the adhesive 211. That is, the bonding layer 20 may be a quantum dot glue layer, a quantum dot layer, or an optical glue layer filled with quantum dots 212.

In addition to the light-emitting effect, the quantum dot material layer 21 can also be used as an adhesive layer to bond the structural layers on both sides thereof. Meanwhile, the quantum dot material layer 21 is bonded between the first panel 10 and the second panel 30. The first panel 10 and the second panel 30 can encapsulate the quantum dot material layer 21, such that protective layers on the upper and lower sides of the quantum dot material layer 21 can be omitted, which is simple and efficient.

Specifically, the adhesive 211 may be at least one of hydrogel, pressure-sensitive adhesive, optical glue, and resin. Therein, the hydrogel may be at least one of acrylamide (AM) and its derivatives, sodium p-styrene sulfonate (SSS), poly (P-(AM-SSS-NVP), and N-vinylpyrrolidone (NVP). The pressure-sensitive adhesive and the optical glue are commonly used adhesives in the field of display panels, and can be used for bonding between film layers. The main components of the pressure-sensitive adhesive and the optical glue include a variety of polyester compounds and mixed solvents, and the specific components are not described here in detail.

For example, when a pressure-sensitive adhesive is used as the adhesive 211, a method for manufacturing the quantum dot material layer 21 includes: dispersing the quantum dots 212 in a non-polar solvent to obtain a quantum dot dispersion solution; diluting the pressure-sensitive adhesive with an ester solvent to obtain a pressure-sensitive adhesive dilution system; mixing the quantum dot dispersion solution with the pressure-sensitive adhesive dilution system to obtain a quantum dot pressure-sensitive adhesive mixed solution; applying the quantum dot pressure-sensitive adhesive mixed solution on the third polarizer 34, and removing the non-polar solvent and the ester solvent in the quantum dot pressure-sensitive adhesive mixed solution to form a quantum dot film; and curing the quantum dot film to obtain the quantum dot material layer 21. Therein, the non-polar solvent may be one or more of n-pentane, n-hexane, n-heptane, cyclopentane, cyclohexane, dichloromethane, chloroform, toluene, and petroleum ether. The ester solvent may include one or more of ethyl acetate, propyl acetate, butyl acetate, and amyl acetate.

For example, when a hydrogel material is used as the adhesive 211, a method for manufacturing the quantum dot material layer 21 includes: loading quantum dots 212 in a hydrogel material to form a quantum dot hydrogel; and uniformly coating the quantum dot hydrogel to form a quantum dot hydrogel film, and obtaining the quantum dot material layer 21.

In this embodiment, the quantum dot material layer 21 is filled with the quantum dots 212, and the quantum dots 212 at least include red quantum dots and green quantum dots.

Specifically, the quantum dots are generally spherical or spheroidal, are made of semiconductor materials (usually composed of IIB-VIA or IIIA-VA elements), and are nanoparticles with a stable diameter of 2-20 nm. As a novel semiconductor nanomaterial, the quantum dots have many unique nanometer properties. Quantum dot materials have the advantages of concentrated emission spectrum, high color purity, and easy adjustment of the luminescent color by the size and structure/composition of the quantum dot material.

Since the red quantum dots can be excited to emit red light under the action of the backlight, and the green quantum dots can be excited to emit green light under the action of the backlight, when a backlight is irradiated onto the quantum dot material layer 21 containing the red quantum dots and the green quantum dots, the light passing through the bonding area of the first panel 10 and the second panel 30 can be prevented from being refracted, thereby preventing light from reflecting at the upper and lower interfaces of the bonding area and causing interference.

Preferably in this embodiment, the red quantum dots are excited to emit the red light with a peak of 520-540 nm and a half-width of 30-40 nm, and the green quantum dots are excited to emit the green light with a peak of 620-640 nm and a half-width of 30-40 nm. A sum of the components of the red quantum dots and the green quantum dots accounts for 50% to 60% of the total components of the quantum dot material layer 21.

In a specific implementation, the materials of the red quantum dots and the green quantum dots include at least one of zinc sulfide, cadmium sulfide, gallium nitride, gallium selenide, zinc selenide, and cadmium selenide.

Therein, zinc sulfide, cadmium sulfide, gallium nitride, gallium selenide, zinc selenide, and cadmium selenide may be undoped materials, and materials of the red quantum dots and the green quantum dots are at least one of the undoped materials. Of course, zinc sulfide, cadmium sulfide, gallium nitride, gallium selenide, zinc selenide, and cadmium selenide may be doped, and materials of the red quantum dots and the green quantum dots are at least one of the doped materials. This embodiment of the present disclosure is not limited to this as long as the quantum dots can be excited to emit light of a desired wavelength. Here, for example, when a metal is added to zinc sulfide, zinc sulfide of the certain metal is added as the miscellaneous zinc sulfide.

Alternatively, the materials of the red quantum dots and the green quantum dots can be graphene quantum dots or carbon quantum dots.

A dimension of the above material is easy to adjust, the above material has optical characteristics and can emit red or green light under the excitation of a blue light source, and the above material is easy to obtain, so as the preferred material of the embodiment of the present disclosure.

Referring to FIG. 1, the first panel 10 is a liquid crystal display panel, the first panel 10 includes a first substrate 11, a second substrate 12 opposite to the first substrate 11, a first liquid crystal layer 13 sandwiched between the first substrate 11 and the second substrate 12, a first polarizer 14 arranged on a side of the first substrate 11 away from the first liquid crystal layer 13, and a second polarizer 15 sandwiched between the second substrate 12 and the bonding layer 20. Therein, an absorption axis of the first polarizer 14 and an absorption axis of the second polarizer 15 are perpendicular to each other.

In a specific implementation, the first panel 10 may further include a TFT substrate, the TFT substrate is sandwiched between the first liquid crystal layer 13 and the second polarizer 15, and the TFT substrate is configured to drive the first liquid crystal layer 13 to deflect.

Referring to FIG. 1, the second panel 30 is a liquid crystal display panel, the second panel 30 includes a third substrate 31, a fourth substrate 32 opposite to the third substrate 31, a second liquid crystal layer 33 sandwiched between the third substrate 31 and the fourth substrate 32, a third polarizer 34 sandwiched between the third substrate 31 and the bonding layer 2, and a fourth polarizer 35 arranged on a side of the fourth substrate 32 away from the second liquid crystal layer 33. Therein, an absorption axis of the third polarizer 34 and an absorption axis of the fourth polarizer 35 are perpendicular to each other, and the absorption axis of the second polarizer 15 and the absorption axis of the third polarizer 34 are parallel to each other.

In a specific implementation, the second panel 30 may further include a TFT substrate, the TFT substrate is sandwiched between the second liquid crystal layer 33 and the fourth polarizer 35, and the TFT substrate is configured to drive the second liquid crystal layer 33 to deflect.

In the display panel 100, the second panel 30 can divide a backlight that is irradiated onto the first display panel 10 into n×m partitions (therein, the n×m is a resolution of the second display panel 30), so that a number of partitions of the backlight has been significantly increased. Meanwhile, the second display panel 30 is not provided with a color filter substrate, thereby achieving a fine adjustment of backlight by controlling the light transmission ratio of each backlight partition. Since the backlight is adjusted by the backlight partitions of the second panel 30, when it is into the first panel 10 for color display, the contrast of light and dark can be significantly improved, thereby improving the display effect, and improving the display quality.

The display panel 100 can achieve a pixel-level backlight modulation and prevent interference fringes from generating in the bonding area of the first panel 10 and the second panel 30.

As shown in FIG. 2, it is a schematic view of a display panel of another embodiment according to the present disclosure. FIG. 2 differs from FIG. 1 in that: the bonding layer 20 includes a quantum dot material layer 21, a first adhesive layer arranged on a side of the quantum dot material layer 21 facing the first panel 10, and a second adhesive layer 23 arranged on a side of the quantum dot material layer 21 facing the second panel 30.

In other words, in this embodiment, the bonding layer 20 adopts a multi-layer structure. A first adhesive layer 22 and a second adhesive layer 23 are respectively arranged on both sides of the quantum dot material layer 21, thereby increasing the lamination between the bonding layer 20 and the first panel 10 and second panel 30 to ensure lamination effect.

Referring to FIG. 2 continually, the quantum dot material layer 21 includes an adhesive 211 and quantum dots 212 dispersed in the adhesive 211. The adhesive 211 may be at least one of hydrogel, pressure-sensitive adhesive, optical glue, and resin. The quantum dots 212 at least includes red quantum dots and green quantum dots.

In a specific implementation, the first adhesive layer 21 and the second adhesive layer 23 may be made of optical glue to achieve better light penetration.

As shown in FIG. 3A and FIG. 3B, FIG. 3A is a first structural and schematic view of the display panel of another embodiment according to the present disclosure, and FIG. 3B is a second structural and schematic view of the display panel of another embodiment according to the present disclosure. FIG. 3A and FIG. 3B differ from FIG. 1 in that: in this embodiment, the bonding layer 20 includes the quantum dot material layer 21 and a bonding adhesive layer 24.

In this embodiment, the bonding layer 20 adopts a multi-layer structure. The bonding adhesive layer 24 is arranged on a side of the quantum dot material layer 21 according to actual demand, thereby increasing a bonding level between the quantum dot material layer 21 and the first panel 10 or the second panel 30. In other words, in a specific implementation, the display panel 100 of the present disclosure has two structures. These will be described in detail below with reference to FIG. 3A and FIG. 3B.

Referring to FIG. 3A, in a first structural and schematic view of this embodiment, the bonding layer includes a quantum dot material layer 21 and a bonding adhesive layer 24. Therein, the bonding adhesive layer 24 is the second adhesive layer 23 that is arranged on a side of the quantum dot material layer 21 facing the second panel 30.

Referring to FIG. 3A and FIG. 3B, the second structure of FIG. 3B differs from the first structure of FIG. 3A in that: the bonding adhesive layer 24 in the second structure is the first adhesive layer 22 arranged on a side of the quantum dot material layer 21 facing the first panel 10.

Specifically, the quantum dot material layer 21 includes an adhesive 211 and quantum dots 212 dispersed in the adhesive 211. The adhesive 211 may be at least one of hydrogel, pressure-sensitive adhesive, optical glue, and resin. The quantum dots 212 at least includes red quantum dots and green quantum dots.

Specifically, the first adhesive layer 21 and the second adhesive layer 23 may be made of optical glue to achieve better light penetration.

In other embodiments, the first panel 10 further includes a color filter layer, the color filter layer is sandwiched between the first substrate 11 and the first liquid crystal layer 13. The third substrate 31 is a transparent substrate, and the second panel 30 is not provided with the color filter layer, thereby preventing the red, green and blue photoresist from affecting the light transmission effect, so as to improve the light transmission rate of the display panel 100.

Figure 4:
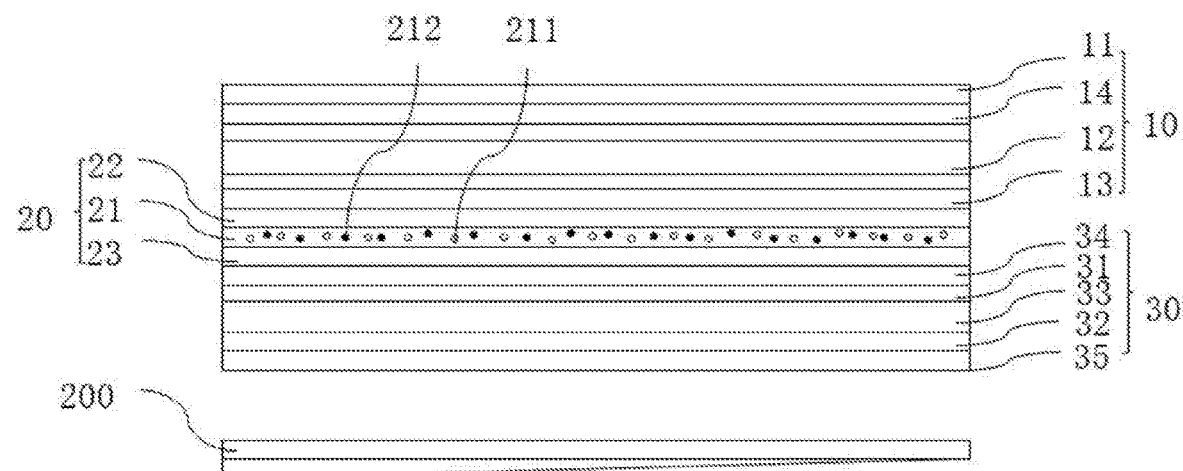
FIG. 4 is a schematic view of a display device of the present disclosure.

FIG. 4 is a schematic view of the display device of the present disclosure. As shown in FIG. 4, the present disclosure further provides a display device, the display device includes a display panel and a backlight module 200. The backlight module 200 is a blue backlight, and the display panel is the above display panel 100. A light source of the backlight module 200 adopts a blue-LED, so the backlight module 200 can emits blue light with high octane towards the display panel 100.

The display panel 100 of the present disclosure can achieve a pixel-level backlight modulation by laminating the first panel 10 and the second panel 30, thereby significantly improving the display effect. By filling quantum dots in the bonding layer 20, the display panel 100 of the present disclosure can avoid the problem of interference fringes existing in the bonding area of the first panel 10 and the second panel 30. Meanwhile, an adhesion protection function of the first panel 10 and the second panel 30 to the bonding layer 20 can encapsulate and protect the quantum dots, thereby reducing the water and oxygen barrier films on a top or bottom surface of the quantum dot layer or the quantum dot adhesive layer.

In the above, the present disclosure has been disclosed as above in the preferred embodiments. However, the preferred embodiments should not be construed as limitations of the present disclosure. Those skilled in the art can make various modifications without departing from the spirit and scope of the present disclosure. Hence, the scope of the present disclosure should be subject to the scope defined in the claims.

INDUSTRIAL APPLICABILITY

The subject matter of the present disclosure can be manufactured and used in industry. Hence, the subject matter of the present disclosure has industrial applicability.

What is claimed is:

1. A display panel, comprising:
   a first panel;
   a second panel; and a bonding layer, wherein the first panel and the second panel are laminated by the bonding layer;

wherein, the bonding layer comprises at least one quantum dot material layer, the quantum dot material layer comprises an adhesive and quantum dots, and the adhesive is made of at least one of hydrogel, pressure-sensitive adhesive, optical adhesive, and resin;

wherein the first panel is a liquid crystal display panel, and the first panel comprises:
a first substrate;
a second substrate opposite to the first substrate;
a first liquid crystal layer sandwiched between the first substrate and the second substrate;
a first polarizer arranged on a side of the first substrate away from the first liquid crystal layer; and
a second polarizer sandwiched between the second substrate and the bonding layer;

wherein the second panel is a liquid crystal display panel, and the second panel comprises:
a third substrate;
a fourth substrate opposite to the third substrate;
a second liquid crystal layer sandwiched between the third substrate and the fourth substrate;
a third polarizer sandwiched between the third substrate and the bonding layer; and
a fourth polarizer arranged on a side of the fourth substrate away from the second liquid crystal layer, wherein the fourth substrate is sandwiched between the second liquid crystal layer and the fourth polarizer; and wherein the third substrate is a transparent substrate;
wherein the quantum dot material layer of the bonding layer is directly sandwiched between and contacts the second polarizer and the third polarizer.

2. The display panel as claimed in claim 1, wherein, an absorption axis of the first polarizer and an absorption axis of the second polarizer are perpendicular to each other; an absorption axis of the third polarizer and an absorption axis of the fourth polarizer are perpendicular to each other; and the absorption axis of the second polarizer and the absorption axis of the third polarizer are parallel to each other.

* * * * *